US006542550B1

(12) United States Patent
Schreiber

(10) Patent No.: US 6,542,550 B1
(45) Date of Patent: Apr. 1, 2003

(54) METHOD FOR PROCESSING AND APPARATUS FOR ENCODING OR DECODING AUDIO OR VIDEO FRAME DATA

(75) Inventor: Ulrich Schreiber, Garbsen (DE)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/478,634

(22) Filed: Jan. 6, 2000

(30) Foreign Application Priority Data

Jan. 12, 1999 (EP) .......................................... 99250009

(51) Int. Cl.[7] ................................................ H04N 7/12
(52) U.S. Cl. ................................................ 375/240.26
(58) Field of Search .............................. 348/715, 716, 348/717, 718, 719, 720, 845.1, 845.2, 845.3, 425.1, 423.1, 425.4, 518; 375/240.26, 240.28, 240.29

(56) References Cited

U.S. PATENT DOCUMENTS

| 4,845,752 | A | | 7/1989 | Blanc et al. ................... 381/31 |
| 6,011,899 | A | * | 1/2000 | Ohishi et al. ................... 386/98 |
| 6,175,683 | B1 | * | 1/2001 | Sugimura et al. .............. 386/95 |
| 6,260,170 | B1 | * | 7/2001 | Lee ............................. 714/769 |
| 6,351,281 | B1 | * | 2/2002 | Copper ........................ 348/192 |

FOREIGN PATENT DOCUMENTS

| EP | 0701374 A2 | 3/1996 | ............ H04N/7/24 |
| WO | WO98/45959 | 10/1998 | ............ H04B/1/66 |

OTHER PUBLICATIONS

Kim, et al: *A Real–Time Implementation of the MPEG–2Audio Encoder*, IEEE Transactions on Consumer Electronics, vol. 43, No. 3, Aug. 1, 1997, pp. 593–597, XP–000742536.

*Optimized Data Time Stamps for Digital Audio and Video on a Stochastic Network*, IBM Technical Disclosure Bulletin, vol. 36, No. 9A, Sep. 1, 1993, p. 183, XP000395356.

* cited by examiner

*Primary Examiner*—Vu Le
*Assistant Examiner*—Behrooz Senfi
(74) *Attorney, Agent, or Firm*—Joseph S. Tripoli; Ronald H. Kurdyla

(57) ABSTRACT

For broadcasting purposes a multi-channel audio encoder board has been designed. Input time stamps are generated which become linked at least in one input processing stage with frames of said audio data to be encoded, wherein the input time stamps or time stamps derived from the input time stamps remain linked with the correspondingly processed frame data in the different processing stages in the processing, but are at least in the last processing stage replaced by output time stamps. In each of theses stages the corresponding time stamp information linked with current frame data to be processed is regarded in order to control the overall delay of the processing.

9 Claims, 2 Drawing Sheets

METHOD FOR PROCESSING AND APPARATUS FOR ENCODING OR DECODING AUDIO OR VIDEO FRAME DATA

FIELD OF THE INVENTION

The invention relates to a method for processing and to an apparatus for encoding audio or video frame data.

BACKGROUND OF THE INVENTION

For broadcasting purposes a 4-stereo-channel real time MPEG audio encoder board has been designed. Such encoders can be realised using DSPs (Digital Signal Processor) wherein the processing as well as input and output interfaces is distributed over several DSPs. The processing is block oriented. For every new block of e.g. 1152 samples the related bitstream part is generated. As processing time for the processing blocks is not constant, and because several processing blocks on each DSP might compete for execution at any time instant, the total processing delay can vary significantly.

A requirement may be that the encoder is able to operate with different encoding parameters because MPEG allows e.g. various sample frequencies and overall data rates.

SUMMARY OF THE INVENTION

The total burden of the real time processing is distributed by means of multi-threading to each DSP and to the software equivalent of FIFO buffers carrying one or more frames or blocks of data, i.e. the encoder in principle consists of a chain of software FIFOs alternating with processing blocks (denoted threads) between the encoder input and output. The following problems need to be solved for a real time processing system:

a) The total input to output delay should either be constant or better be definable (within the given memory constraints) for both, external and internal requirements. Enforcing a minimum delay will assure that enough processing time even for the worst case (an input data sequence resulting in maximum processing time) is available without temporary underflow of the output buffer (consider start with low delay time and afterwards increased processing time).

b) A sufficiently simple and reliable way for controlling this delay is required for serviceability.

It is one object of the invention to disclose a method for processing audio or video frame data in which processing the delay between different processing stages as well as the overall delay can be adapted, particularly when a presentation of audio data together with the related video is required.

It is a further object of the invention to disclose an apparatus for encoding audio data which utilises the inventive method.

Normally the audio or video frames are processed in an encoder in subsequent different stages, for example conversion to frequency coefficients in a first stage and bit allocation and quantisation in a further stage. In a path in parallel to the first stage the (psychoacoustic) masking is calculated.

In the invention the overall input to output delay is controlled by applying a time stamp based mechanism related to a system time base. Upon entering into the system, input data, e.g. per frame or block of data, are stamped with the present system time, i.e. an input time stamp ITS. This time stamp is then passed along together with the main data through the processing stages, e.g. in the format of a linked data field. Somewhere during the processing the intended output time for an output frame or block of data is calculated, using in principle the calculation $$OTS=ITS+DELAY,$$

wherein OTS is an output time stamp. OTS is then used by the output stage to control that the output data are output at the intended time.

Additionally, encoding parameters required for a specific processing path can be added to the input streams for the audio channels by linking them with the associated audio data and by storage in the various buffers together with its audio data, i.e. the corresponding encoding parameters are kept linked with the audio data to be encoded throughout the encoding processing in the different data streams and data paths. Preferably the original encoding parameters assigned to the processing paths become converted to a different format in order to minimise the required word length and/or to facilitate easy evaluation in the related processing stages. Thereby each data stream can be processed with the correct parameter set without waiting for finishing encoding of the old data stream and for reset and loading of new parameters before starting encoding of a new data stream with new parameters.

The invention can also be used for audio or video decoding with a corresponding inverse order of processing stages.

In principle, the inventive method is suited for processing audio or video frame data which are processed in succeeding different processing stages wherein input time stamps are generated which become linked at least in one input processing stage with frames of said audio or video data to be encoded, and wherein said input time stamps or time stamps derived from said input time stamps remain linked with the correspondingly processed frame data in said different processing stages in the processing but are at least in the last processing stage replaced by output time stamps denoting the presentation time, and wherein in each of theses stages the corresponding time stamp information linked with current frame data to be processed is regarded in order to control the overall delay of the processing.

In principle the inventive apparatus is suited for encoding audio frame data which are processed in succeeding different processing stages, and includes:

means for generating time stamp information including input time stamps and output time stamps;

means for linking time stamp information with frames of said audio data or processed audio data, respectively;

means for converting time domain samples into frequency domain coefficients, to the input of which means buffer means are assigned;

means for calculating masking properties from said time domain samples, to the input of which means buffer means are assigned;

means for performing bit allocation and quantisation of the coefficients under the control of the output of said masking calculating means, to the input of which bit allocation and quantisation means buffer means are assigned;

means (AES-EBU__A) for controlling presentation of the final output data at or at about a time corresponding to said output time stamps, wherein said input time stamps become linked at least for one input processing stage with frames of said audio data to be encoded and said input time stamps or time stamps derived from said input time stamps remain linked with the correspondingly processed frame data in said conversion means, in said masking calculating means and in said bit allocation and quantisation means, but at least in the last processing stage in the encoding processing are replaced by output time stamps, and wherein in each of theses stages the corresponding time stamp information linked with current frame data to be processed is regarded in order to control the overall delay of the encoding processing.

BRIEF DESCRIPTION OF THE DRAWINGS

Embodiments of the invention are described with reference to the accompanying drawings, which show in.

DETAILED DESCRIPTION OF PREFERRED EMBODIMENTS

Figure 1:
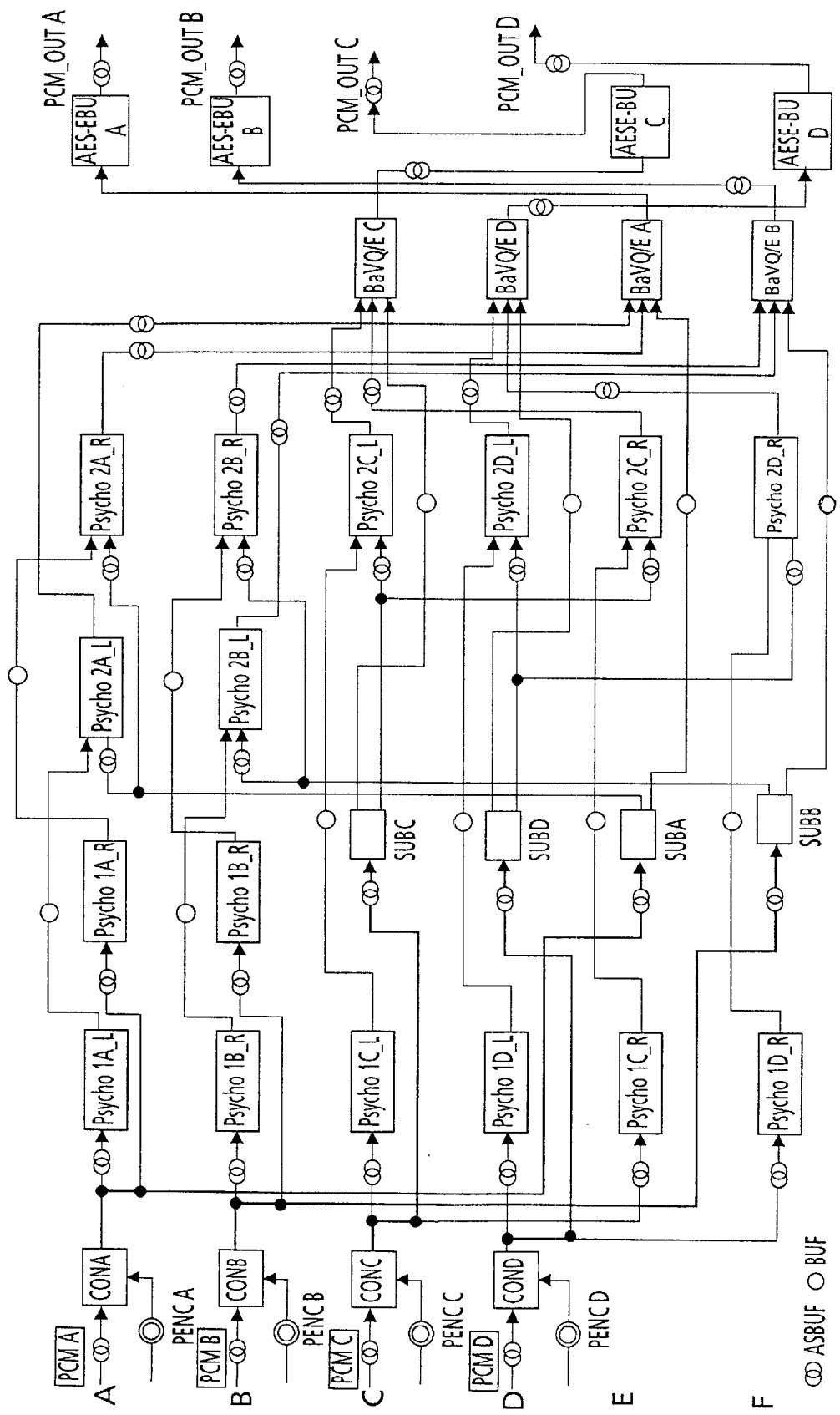
FIG. 1 functional block diagram of a 4-channel audio encoder.

The audio encoder in FIG. 1 receives four stereo PCM input signals PCMA, PCMB, PCMC and PCMD. E.g. MPEG audio data are frame based, each frame containing 1152 mono or stereo samples. The encoder operating system of FIG. 1 may include six DSPs (not depicted) for the encoding of the four MPEG channels. These DSPs form a software encoder which includes the technical functions depicted in FIG. 1. A suitable type of DSP is for example ADSP 21060 or 21061 or 21062 of Analog Devices. As an alternative, the technical functions depicted in FIG. 1 can be realised in hardware.

Synchronisation of the software running on the six DSPs, or on corresponding hardware, is achieved using FIFO buffers wherein each buffer is assigned to one or some specific frames. This means that at a certain time instant a current frame as well as previous frames, the number of which depends from the quantity of available buffers, are present in the processing stages.

Between some of the stages asynchronous buffers ASBUF are inserted which allow asynchronous write and read operations. Between other stages synchronous buffers BUF are sufficient. The PCM input signals PCMA, PCMB, PCMC and PCMD each pass via an asynchronous buffer to a respective converter CONA, CONB, CONC and COND. In such converter an integer-to-floating representation conversion of the audio samples to be encoded may take place. It is also possible that the encoder processes integer representation audio samples.

In such converter also one or more kinds of energy levels in a frame may be calculated, e.g. energy of all samples of the frame or average energy of the samples of a frame. These energy values may be used in the subsequent psychoacoustic processing.

In addition, in such converter the possibly adapted encoding parameters can become linked with the frame audio data. In respective parameter encoders PENCA, PENCB, PENCC and PENCD the original encoding parameters may be converted as described above and then fed to CONA, CONB, CONC and COND, respectively.

Via asynchronous buffers the output data of CONA, CONB, CONC and COND are fed in parallel to subband filters SUBA, SUBB, SUBC and SUBD and to first left and right channel psychoacoustic calculators Psycho1A_L, Psycho1A_R, Psycho1B_L, Psycho1B_R, Psycho1C_L, Psycho1C_R, Psycho1D_L and Psycho1D_R, respectively. The subband filters divide the total audio spectrum into frequency bands, possibly using FFT, and may calculate the maximum or scale factor of the coefficients in a frequency band or subband. Within the frequency bands a normalisation may be carried out. The subband filters take into account the above time stamp information and possibly the relevant encoding parameters read from the corresponding upstream asynchronous buffer.

The first psychoacoustic calculators perform an FFT having a length of e.g. 1024 samples and determine the current masking information. Each first psychoacoustic calculator can be followed by a second psychoacoustic calculator Psycho2A_L, Psycho2A_R, Psycho2B_L, Psycho2B_R, Psycho2C_L, Psycho2C_R, Psycho2D_L and Psycho2D_R, respectively, which evaluates the maximum or scale factor values previously calculated in the subband filters. The first and second psychoacoustic calculators take into account the above time stamp information and possibly relevant encoding parameters read from the corresponding upstream asynchronous buffers.

The output signals of Psycho2A_L, Psycho2A_R, Psycho2B_L, Psycho2B_R, Psycho2C_L, Psycho2C_R, Psycho2D_L and Psycho2D_R are used in bit allocators and quantisers Bal/Q/E_A, Bal/Q/E_B, Bal/Q/E_C and Bal/Q/E_D, respectively, for determining the number of bits allocated and the quantisation the audio data coefficients coming from the associated subband filter via a buffer. It is also possible to calculate in the second psychoacoustic calculators in addition what is being calculated in the first psychoacoustic calculators and thereby to omit the first psychoacoustic calculators. Finally, the outputs of Bal/Q/E_A, Bal/Q/E_B, Bal/Q/E_C and Bal/Q/E_D pass through an asynchronous buffers and output interfaces AES-EBU_A, AES-EBU_B, AES-EBU_C, AES-EBU_D, respectively, which deliver the encoder stereo output signals PCM_Out_A, PCM_Out_B, PCM_Out_C, PCM_Out_D, respectively. The output interfaces may correspond to IEC 958.

A video encoder includes the following stages: block difference stage, DCT (discrete cosine transform), quantisation and in the feedback loop inverse quantisation, inverse DCT, motion compensated interpolation the output of which is input to the block difference stage, wherein the output of the quantisation is possibly VLC (variable length coding) encoded and buffered before final output and the buffer filling level is used to control the quantisation in such a way that encoding artefacts are masked as far as possible.

In the invention the following elements are required:
a system time base supplying a system time, that delivers unique values for all comprised input and output stages;
hardware and/or software mechanisms that relates system time base and input data to obtain sufficiently precise input time stamps (ITS);
hardware and/or software mechanisms that relates the system time base with the data output to obtain sufficiently precise output according to the output time stamps (OTS).
These elements are used in the following way:
a) Per input interface of the system, input data are related to the system timer, i.e. an input time stamp ITS along with the incoming data is obtained and assigned to the data frames. For example, the system time of the sampling moment of the first sample of a sampled audio data block or frame is used therefore.

b) In the case of multiple inputs, the input data blocks can be realigned across the channels by the time information given by the input time stamps.

Example 1: multichannel audio inputs distributed over several two-channel interfaces.

Example 2: bitstream outputs of multiple stereo encoders shall be multiplexed into an MPEG TS (transport stream) with a well-defined time relation across the channels, i.e. equal delay possibility.

c) From input time stamps ITS and the intended overall delay DELAY output time stamps OTS for the output data are calculated.

In the easiest processing case where one output data block per input data block is calculated by the system, the intended output time of each output block is given by OTS(n)=ITS(n)+DELAY, n=0,1, 2... denoting the data block number.

In the case where per input data block several output data blocks or even a non-integer number of output blocks is to be generated, the OTS for each of the output blocks can be interpolated according to the corresponding time ratios. An example is the MPEG encoder 1152 samples input, or an MPEG PES packet with one or more ESPs (elementary stream packets), and the MPEG TS transport stream wherein the packets have a length of 188 Bytes, i.e. for each sample frame 3 to 7 TS packets are required for transmission.

d) Each output interface examines the output data blocks, as supplied to the output buffer by the processing stages, for their related OTS in relation to the present system time. If OTS is indicating a time instant that has already passed the output data block can be discarded or can be output immediately, depending on the application. If the OTS is pointing to a future time instant the output stage will wait until that time instant has come and during the wait time can either output nothing or a defined filling pattern.

A couple of related mechanisms are available which can be used in different combinations as required for the I/O process to be implemented.

In an example minimum hardware scenario the system makes use of a single hardware timer, which is typically already part of each DSP, in combination with some kind of regular or controlled output driver software activation. The rest of the delay control is then executed by the DSP. In principle two timer functions are required:

A 'getTime( )' function, that allows the software to ask for the actual system time. Upon reception (DMA or INT based) of the beginning or the end of each input data block the getTime( ) function can be used to obtain the ITS for that block.

The output function may need a certain delay before sending an output block for which the corresponding processing has finished. This can either be done in a polling manner, i.e. by cyclic control of the actual system time vs. OTS if some kind of cyclic activation is available, or by a specific timer-based delay function that issues an interrupt after a definable delay 'interruptAfter(DELAY)' or 'threadActivityAfter (DELAY)' function.

The single hardware timer, operating as a backward counter with interrupt at zero, and the input and output DMA block-complete interrupts which are build-in functions of the DSPs, are used.

The single hardware timer can provide the functions 'interruptAfter(DELAY)' and 'getTime( )', wherein for the latter function the subsequent delay times loaded to the timer are summed up to obtain a continuos system time and wherein several 'interruptAfter(DELAY)' functions can run in parallel.

In the case of a multi-DSP system with each DSP implementing it's own timer, but distributing inputs and outputs with delay requirements between them across different DSPs, there is a problem of timer synchronicity. This problem can be solved by a special cyclic interrupt signal (e.g. of 10 ms length) that is applied to all DSPs in the system and that is used to resynchronise the system times. The counter output word may have the format iiii.ffff, wherein iiii is interpreted as integer part and ffff is interpreted as fractional part. Every 10 ms iiii is incremented by '1'. This event is transmitted to the DSPs and is counted therein. The maximum manageable value for DELAY depends on the word length of iiii. Thereby the interrupt indicates the moment of resynchronisation and during the interrupt period a master value iiii for the time is transmitted from one master DSP to all other DSPs. At this time instant ffff is set to zero.

While the delay control described in above example scenario requires minimum hardware only and thus leaves most of the job to (cheaper and mote flexible) software, the disadvantage is that the delay time accuracy is limited by e.g. interrupt latency times, maximum interrupt disable times and, in case of a multi-DSP system, bus arbitration delays. If the achieved accuracy is not sufficient, hardware enhancements can be used that make the process of obtaining ITS relative to system time and output at OTS relative to system time more accurate. A combined solution with software determining the rough point in time and special hardware establishing the exact point in time will achieve a compromise between required DSP reaction time (tends to be slow compared to hardware) and hardware complexity (tends to be more complex the longer the time periods are).

A theoretical overflow beginning at the buffers related to the last processing stages and proceeding to the buffers related to the front processing stages is prevented by handshake between the DSPs.

Figure 2:
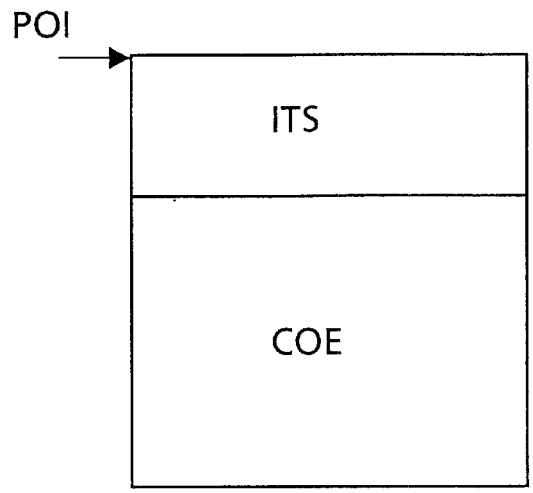
FIG. 2 linked data field including audio data to be encoded and associated input time stamp data.

FIG. 2 shows a data field including audio samples or audio coefficients COE for a frame or block. To these samples or coefficients an input time stamp information ITS is linked or assigned. An address pointer POI indicates the begin of the input time stamp information ITS. Beginning at the second processing stage ITS can be replaced by (ITS+DELAY) and PCR (MPEG program clock reference) wherein DELAY is the user-defined delay. At the last processing stages ITS or (ITS+DELAY) can be replaced by OTS.

The MPEG program clock reference PCR is a 33 bit word clock representing a 90 kHz clock frequency.

Additionally, encoding or decoding parameters including for instance mode information (mono, stereo, dual, joint stereo), sample rate and data rate information, length of the data field and/or type of MPEG layer can be linked to COE.

Figure 3:
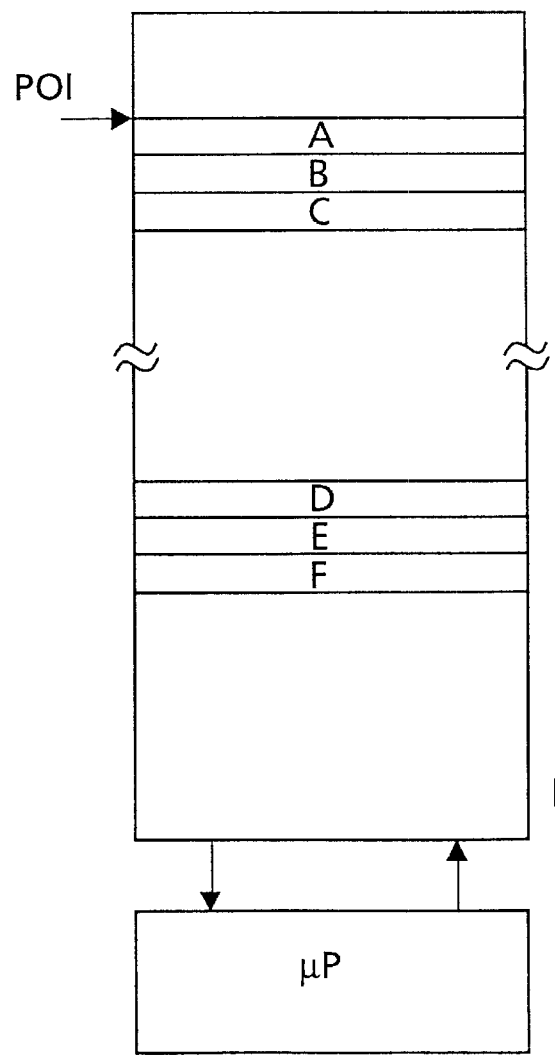
FIG. 3 microprocessor with memory including linked data fields.

In FIG. 3 a microprocessor or DSP $\mu P$ is shown together with its memory MEM. In the memory some data fields A to F are depicted which correspond to data fields as shown in FIG. 2. E.g. data fields A, B and C may correspond to data fields of three succeeding audio frames in one of the data paths of FIG. 1. Data field A may include other ITS, (ITS+DELAY) or OTS information or encoding parameters than data fields B and C. The address of the begin of data field B can be calculated by adding the length of data field A to POI. The software running on $\mu P$ can use the following example commands in C-language for constructing the data fields according to FIG. 2:

```
typedef struct {
    .
    .
    .
    int bitrate_index int sampling_frequency
    .
    .
    .
} layer;
```
"struct" may also contain time stamp information.
define FRAMESIZE 1152 /*1152 is a decimal number*/
```
typedef struct {
    .
    .
    .
    layer info
    .
    .
    .
    float PCMBuf[FRAMESIZE]
} FloatBuffer_L_Type
```

The inventive delay control can also be applied for single DSP systems and for any other kind of real time processing.

In simplified applications, e.g. in an AC-3 decoder, computing a single data frame after reception with the real time constraint that the processing time for each block must be shorter than the frame period is an often used approach.

This approach can be extended to a solution with more distributed processing including splitting into several subsequent processing stages, eventually distributed over several DSPs. In this case each processing stage can be forced into a well defined 'time slot', where for each processing stage the processing time must be shorter than the time slot length. In contrast to the solution described first, instead of a single time constraint there would be one time constraint per time slot/processing stage.

The invention has the following advantages:
freely choosable delay, including implementation of user selectable delay. The delay may vary between a two-frame period (48 ms) and e.g. 1.5 sec;
software dominated implementations as well as hardware enhanced implementations for improved delay time precision or reduced jitter are possible;
single (minimum) delay time parameter constraining the real time processing in contrast to one maximum execution time per processing stage;
easy implementation of systems where an input data frame processing time is temporarily larger (but not in the average) than the data frame period.

The invention can be used e.g. for MPEG 1, 2 and 4 Audio encoding and decoding for MPEG layers 1, 2 or 3, Digital Video Broadcast DVB, for AC-3, MD and AAC processing, for DVD processing and Internet applications concerning audio data encoding and decoding.

What is claimed, is:

1. Method for processing audio or video frame data which are processed in succeeding different processing stages, including the steps:
generating input time stamps which become linked at least in one input processing stage with frames of said audio or video data to be encoded;
keeping said input time stamps or time stamps derived from said input time stamps linked with the correspondingly processed frame data in said different processing stages in the processing, but replacing at least in the last processing stage said input time stamps by output time stamps denoting the presentation time, wherein in each of theses stages the corresponding time stamp information linked with current frame data to be processed is used in order to control the overall delay of the processing.

2. Method according to claim 1, wherein to each stage a buffer is assigned at its input and wherein the buffers contain data fields including audio frame data and the associated time stamp information.

3. Method according to claim 2, wherein said buffers are controlled like FIFOs and the total processing delay is distributed over the chain of FIFOs.

4. Method according to claims 1, wherein the processing is carried out using multiple DSPs and the internal DSP timers are synchronised using a slow periodic interrupt signal in order to achieve a unique system time across all DSPs.

5. Method according to claims 2, wherein the processing is carried out using multiple DSPs and the internal DSP timers are synchronised using a slow periodic interrupt signal in order to achieve a unique system time across all DSPs.

6. Apparatus for encoding audio frame data which are processed in succeeding different processing stages, and including:
means for generating time stamp information including input time stamps and output time stamps;
means for linking time stamp information with frames of said audio data or processed audio data, respectively;
means for converting time domain samples into frequency domain coefficients, to the input of which means buffer means are assigned;
means for calculating masking properties from said time domain samples, to the input of which means buffer means are assigned;
means for performing bit allocation and quantisation of the coefficients under the control of the output of said masking calculating means, to the input of which bit allocation and quantisation means buffer means are assigned;
means for controlling presentation of the final output data at or at about a time corresponding to said output time stamps, wherein said input time stamps become linked at least for one input processing stage with frames of said audio data to be encoded and said input time stamps or time stamps derived from said input time stamps remain linked with the correspondingly processed frame data in said conversion means, in said masking calculating means and in said bit allocation and quantisation means, but at least in the last processing stage in the encoding processing are replaced by output time stamps, and wherein in each of theses stages the corresponding time stamp information linked with current frame data to be processed is used in order to control the overall delay of the encoding processing.

7. Apparatus according to claim 6, wherein said buffer means contain data fields including audio frame data and the associated time stamp information.

8. Apparatus according to claim 6, wherein said buffer means are controlled like FIFOs and the total processing delay is distributed over the chain of FIFOs.

9. Apparatus according to claim 7, wherein said buffer means are controlled like FIFOs and the total processing delay is distributed over the chain of FIFOs.

* * * * *